(12) United States Patent
Milivojevic et al.

(10) Patent No.: US 10,883,620 B2
(45) Date of Patent: Jan. 5, 2021

(54) RESPONSE TIME MANAGED VALVES AND THEIR APPLICATIONS

(71) Applicant: Bright Energy Storage Technologies, LLP, Arvada, CO (US)

(72) Inventors: Nikola Milivojevic, Boulder, CO (US); Yusuf Gurkaynak, Arvada, CO (US); Jacob Lee Fitzgerald, Denver, CO (US); Scott Raymond Frazier, Morrison, CO (US)

(73) Assignee: Bright Energy Storage Technologies, LLP, Arvada, CO (US)

( * ) Notice: Subject to any disclaimer, the term of this patent is extended or adjusted under 35 U.S.C. 154(b) by 87 days.

(21) Appl. No.: 15/868,566

(22) Filed: Jan. 11, 2018

(65) Prior Publication Data

US 2018/0195634 A1 Jul. 12, 2018

Related U.S. Application Data

(60) Provisional application No. 62/445,326, filed on Jan. 12, 2017.

(51) Int. Cl.
*F16K 31/00* (2006.01)
*F01L 9/04* (2006.01)
(Continued)

(52) U.S. Cl.
CPC .............. *F16K 31/003* (2013.01); *F01L 9/04* (2013.01); *F16K 31/008* (2013.01);
(Continued)

(58) Field of Classification Search
USPC ............................................ 123/90.11, 90.15
See application file for complete search history.

(56) References Cited

U.S. PATENT DOCUMENTS 4,783,990 A * 11/1988 Eberle ..................... G01L 3/245
73/114.38
5,390,633 A * 2/1995 Taue ........................ F01L 3/205
123/65 V (Continued)

FOREIGN PATENT DOCUMENTS

WO 2016082035 A1 6/2016

*Primary Examiner* — Patrick Hamo
*Assistant Examiner* — Wesley G Harris
(74) *Attorney, Agent, or Firm* — Ziolkowski Patent Solutions Group, SC

(57) ABSTRACT

A valve assembly that provides reliable opening and closing valves at specified times despite changing performance characteristics of the valve is disclosed. The valve assembly includes a controllable valve selectively actuatable to control flow of a fluid therethrough, with the controllable valve having a variable valve open/close response time. The valve assembly also includes a plurality of sensors configured to measure current operational parameters of the controllable valve and/or the fluid and a valve controller programmed to process valve timing control instructions generated by an external source, process inputs from the plurality of sensors regarding the measured operational parameters of the controllable valve and/or the fluid, and provide an actuation signal to the controllable valve based on the valve timing control instructions and the inputs from the plurality of sensors, so as to control a timing of an actuation of the controllable valve.

15 Claims, 7 Drawing Sheets

(51) Int. Cl.
  *H01H 3/42* (2006.01)
  *G05G 5/04* (2006.01)
  *F16K 37/00* (2006.01)
  H01H 5/04 (2006.01)
  H01H 1/26 (2006.01)
  F02D 41/00 (2006.01)

(52) U.S. Cl.
  CPC ........ *F16K 37/005* (2013.01); *F16K 37/0041* (2013.01); *G05G 5/04* (2013.01); *H01H 3/42* (2013.01); *F01L 2800/00* (2013.01); *F02D 2041/001* (2013.01); *H01H 5/045* (2013.01); *H01H 2001/265* (2013.01)

(56) References Cited

U.S. PATENT DOCUMENTS

| | | | |
|---|---|---|---|
| 6,549,390 B1* | 4/2003 | Ozawa | F01L 9/04 361/139 |
| 6,871,617 B1* | 3/2005 | Winstead | F01L 9/04 123/90.11 |
| 2002/0189575 A1* | 12/2002 | Rayl | F01L 13/0005 123/198 F |
| 2006/0150932 A1* | 7/2006 | Naber | F01L 9/04 123/90.11 |
| 2017/0261114 A1* | 9/2017 | Klassen | G05G 3/00 |

\* cited by examiner

RESPONSE TIME MANAGED VALVES AND THEIR APPLICATIONS

CROSS-REFERENCE TO RELATED APPLICATION

The present application is a non-provisional of, and claims priority to, U.S. Provisional Patent Application Ser. No. 62/445,326, filed Jan. 12, 2017, the disclosure of which is incorporated herein by reference in its entirety.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2016 BRIGHT ENERGY STORAGE TECHNOLOGIES, LLP.

BACKGROUND OF THE INVENTION

The exemplary, illustrative, technology herein relates to systems, software, and methods for the precision control of valves operating under changing operating conditions of temperature, pressure, and viscosity, where the operation of the valve requires precision timing in order to optimize the overall system performance. The technology herein has applications in the areas of operation and control of fluid power machinery.

WO2016082035A1 describes a buckled reed valve for use in industrial machinery, and in particular, for use in compressor/expander (CE) positive displacement engines. Referring to FIG. 1, an exemplary prior art buckled reed valve (1000) is shown. The reed valve (1000) includes a thin beam, or reed (1100), formed from a spring material (i.e., spring steel, stainless steel, copper). Reed (1100) is mounted between two opposing rigid fixation points (1220 and 1230) such that the reed is loaded in compression along the length of the reed to induce buckling between the opposed ends of the reed. The reed valve includes at least one electromagnet (1400) disposed adjacent to an actuating area (1130a, 1130b). When reed valve (1000) is operated, a magnetic field is generated in electromagnet (1400) by energizing the electromagnet with an electric current. The magnetic field provides activation energy to toggle reed valve (1000) between a closed position and an open position. When the reed is in an open configuration (1120b), passageway (1210) is open which allows fluid flow between a first chamber (1510) and a second chamber (1520) of the valve. Reed valve (1000) can include a second electromagnet (1410) opposing electromagnet (1400), which can be used to provide activation energy to toggle reed (1100) to a closed configuration (1120a, 1130a).

The opening and closing speed of the valve increases and/or decreases as a function to temperature of the valve components (such as the valve body, reed, and electromagnet), and temperatures, pressures, and viscosity of the fluid medium flowing through the valve. These variables prevent the valve from being open and closed with consistent timing as the valve is used in ordinary operating conditions. Irregular valve open/close times cause performance degradation in the machinery into which they are installed. There is need for a valve assembly that can reliably open/close within at a specific amount of time, and that is capable of autonomously adapting to changes in valve performance characteristics in order to actuate a valve at a specified point in time despite varying operating performance characteristics of the valve.

One particular challenge for electromagnetically actuated valves is that the magnet characteristics change as the magnet heats, which changes the electromagnetic characteristics of the electromagnet(s). Experimentation has shown that this degradation results in changes in valve response times that can be significant enough to disrupt the operation of systems requiring precision valve timing.

Known compressor/expander (CE) machines include multiple controllable valves, each of which is configured to modulate the flow of a compressed fluid (liquid or gas). Typically, these valves are electromagnetically actuated valves that have a regular, high frequency duty cycle. These valves are particularly vulnerable to heating because of the extreme duty cycle as they open and close one or more times in response to each turn of the shaft. The electromagnets in these valves heat in response to the current flow of their continual activation, degrading their performance. In some cases, the performance difference may be several milliseconds (corresponding to 25 degrees or more of shaft rotation, depending upon shaft speed). Differences in open/close time with respect to the shaft position increasingly degrade the performance of connected equipment, up to the point where, as shaft speeds increase, the error in the valve open/close timing inhibits the operation of the CE engine. In applications requiring precision valve operation for optimum performance, this degradation must be compensated for.

BRIEF DESCRIPTION OF THE INVENTION

In accordance with one aspect of the invention, a valve assembly includes a controllable valve selectively actuatable to control flow of a fluid therethrough, with the controllable valve having a variable valve open/close response time. The valve assembly also includes a plurality of sensors configured to measure current operational parameters of the controllable valve and/or the fluid and a valve controller programmed to process valve timing control instructions generated by an external source, process inputs from the plurality of sensors regarding the measured operational parameters of the controllable valve and/or the fluid, and provide an actuation signal to the controllable valve based on the valve timing control instructions and the inputs from the plurality of sensors, so as to control a timing of an actuation of the controllable valve.

In accordance with another aspect of the invention, a controller implemented method for controlling actuation of a valve having a variable valve open/close response time to control flow of a fluid therethrough is provided. The method includes receiving valve timing control instructions from an external source, the valve timing control instructions associated with operation of an external machine operationally connected to the valve and measuring one or more current operating parameters of the valve and/or the fluid flowing therein via a plurality of sensors positioned on or adjacent the valve. The method also includes determining a timing adjustment to apply to the valve timing control instructions based on the measured one or more current operating parameters and generating and providing an actuation signal to the valve with the timing adjustment included therein, so as to control a timing of the actuation of the valve.

In accordance with yet another aspect of the invention, a compressor-expander (CE) system includes a CE engine driven by a CE engine shaft and one or more valve assemblies configured to control the flow of one or more pressurized fluids or gasses to drive rotation of the CE engine shaft. Each of the one or more valve assemblies comprises a microcontroller that operates to receive valve timing control instructions generated by a CE engine controller, receive inputs from a plurality of sensors positioned on or adjacent a valve of the valve assembly that comprise current operational parameters of the valve and/or the pressurized fluids or gasses measured by the plurality of sensors, determine a timing adjustment to apply to the valve timing control instructions based on the inputs, and generate and provide an actuation signal to the valve with the timing adjustment included therein, so as to control a timing of the actuation of the valve.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
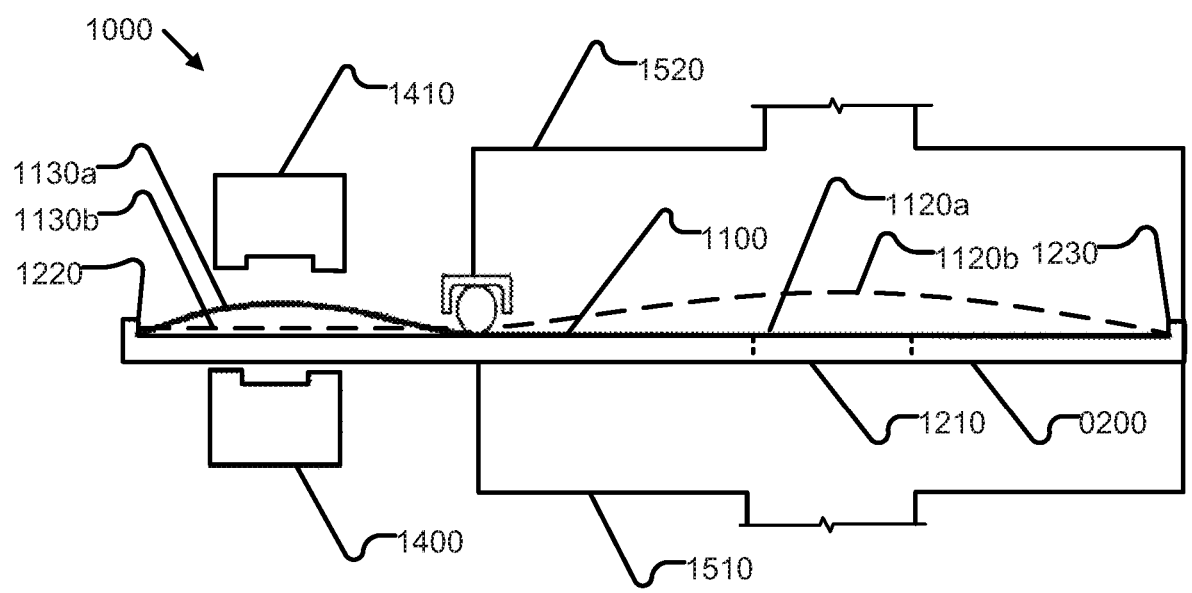
FIG. 1 depicts a schematic view of a known (prior art) buckled reed valve in open and closed configurations.
Figure 2:
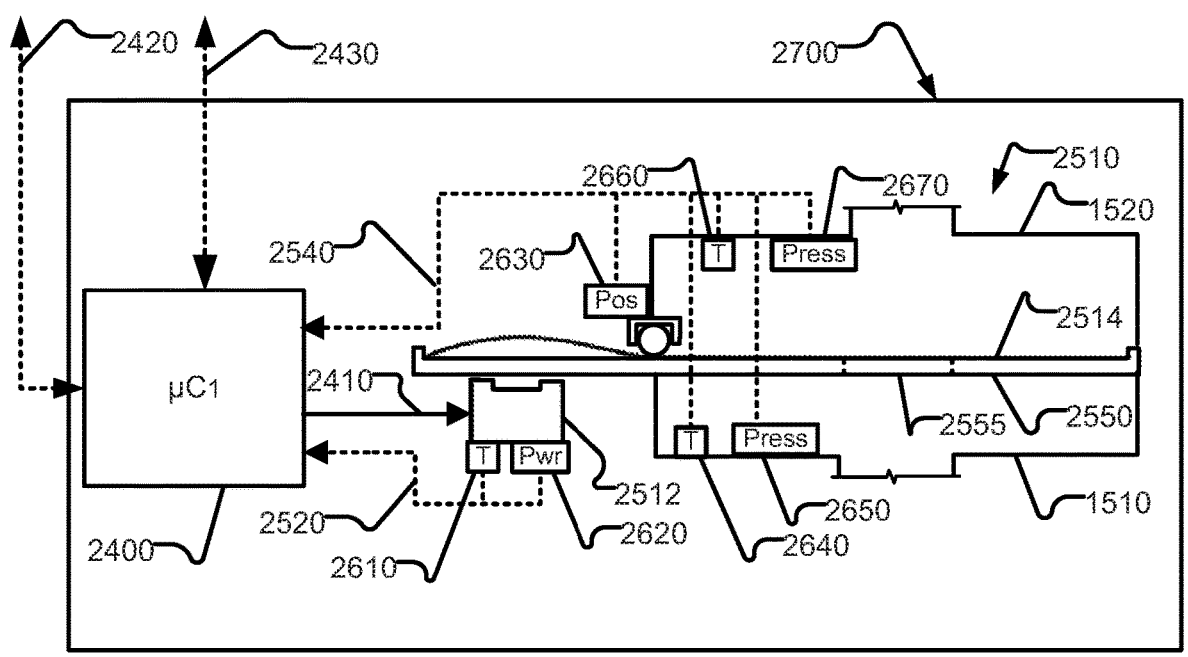
FIG. 2 depicts a schematic diagram of a non-limiting exemplary valve microcontroller and valve that implements the described techniques for controlling the timing of valve actuation according to one aspect of the present invention.

The exemplary illustrative technology described herein includes valve assemblies, valve control systems, and valve control methods for reliable opening and closing valves at specified times despite changing performance characteristics of the valve. Example valves that benefit from this technology include electromagnetically actuated valves, such as reed valves, ball valves, and butterfly valves. Referring first to FIG. 2, an illustrative response time managed buckled beam valve is shown. The basic structure of the valve is similar to the prior art buckled reed valve detailed in FIG. 1, with the addition of sensors, a microprocessor running control software that changes the valve performance based upon combinations of variables that can include temperature and pressure of working fluids and the temperature of various valve components in order to assure specific operating performance characteristics of the valve.

A valve assembly according to one aspect of the invention includes a buckled reed valve, sensors to determine current operating conditions of the reed valve, and a valve microcontroller that receives data from the sensors, adjusts valve timing based on the sensor data, and provides an adjusted actuating signal to the valve. The valve microcontroller adjusts valve actuation timing based on current valve operating conditions so that valve opens or closes in a manner that is properly synchronized with external timing instructions.

Referring again to FIG. 2, valve assembly (2700) includes valve microcontroller (2400) running valve monitoring and control software, reed valve (2510), and sensors (2610 through 2670) each of which is electrically connected to the valve microcontroller. Valve microcontroller (2400) communicates with other control components over communication link (2420) to receive valve timing control instructions and to report valve operating information. The valve controller is optionally connected to timing and/or trigger source (2430). The communications link is typically an interface upon which commands and configuration settings are received by the valve microcontroller, and upon which status information and alerts are sent by the valve microcontroller. Examples of such interfaces include a controller area network (CAN), an Ethernet, serial, or other such interfaces. The timing/trigger source may be an interface like the communications link over which process related information is conveyed (such as shaft angle, process temperature, or pressure), a timing signal from a clock or rotating shaft, or may be an simple electrical voltage (or lack thereof) that indicates that the valve should be set to an open condition and a second voltage (or lack thereof) to indicate that valve should be set to a closed condition. The two links may be encoded using digital signals or using analog voltages.

Valve timing control instructions received by the valve controller include desired valve state (e.g. valve ON/OFF state), timing for valve ON/OFF state relative to a signal provided on the timing/trigger link, operating condition of a machine or relative to a process condition such as temperature or pressure of the valve or materials flowing thru the valve, valve setting parameters such as percent to open or close, etc. Exemplary process conditions can include a pressure measured at a pump or in a tank or temperature of a process fluid or gas or some other process temperature such as, for example, temperature of a chamber or of a process material such as, for example, an atomic layer deposition (ALD) substrate or other material being treated or otherwise acted upon by a process. Alternatively, or in addition, valve timing control instructions can include one or more intervals after an activation pulse by which the valve should be in an open or closed position. Exemplary valve timing control instructions can also include requirements for a plurality of valve opening and closing actuation intervals, for example instructions indicating that a valve should be fully open or fully closed by, for example, not before 25 msec and not after 28 msec after receiving a timing pulse.

One non-limiting example of timing control instructions include ON/OFF timing relative to a measurable machine parameter such as, for example, an encoded rotary shaft angle. The encoded rotary shaft position may be transmitted to the microcontroller on communication link 2420 or on timing link 2430 For example, valve timing control instructions can include ON angle of 170° and OFF angle of 290° meaning that the valve should be fully open when the shaft angle equals 170° and should be fully closed when the shaft angle equals 290°. Angle-based timing instructions can include ON/OFF at a specified offset from a pulse trigger point if the valve microcontroller (2400) receives a timing pulse indicating when the shaft passes a specific trigger point. If valve microcontroller (2400) is capable of monitoring current position of the shaft, i.e. if the valve microcontroller receives current data from a shaft angle sensor over timing link (2430), angle-based timing instruction can include a specific angle at which to open or close.

Valve operating information reported by the valve microcontroller (2400) to other control components over communication link (2420) can include valve status, such as, for example, current valve open/close position or current valve position (e.g. percent open), overall valve temperature, temperature of individual valve components such as temperature of a valve actuator (i.e., component that supplies an actuating force) and temperature of a valve actuation component (i.e. component that moves in response to actuating force to open or close the valve), pressures and temperatures of fluids in contact with the valve, actuation timing (actual, and actual vs. requested), and similar information including external data such as that reported to valve microcontroller (2400) by various sensors associated with valve (2510), as will be discussed in more detail below.

Sensors (2610 through 2670) are disposed within the valve assembly in order to measure temperature, pressure, and position associated with valve (2510), to measure the power usage and temperature of electromagnetic elements. These sensors are connected to the microcontroller in order to communicate signals encoding measurement data related to one or more aspects of the valve assembly to valve microcontroller (2400). Alerts for temperature, pressure, and operating performance variations, as well was valve open/close state changes are transmitted from the microcontroller, along with temperature and pressure data, for example temperature, pressure, and viscosity of a fluid flowing thru the valve can also be sent by the microcontroller to an external controller, such as a higher level control component or a machine controller, over communication link (2420).

Electromagnet temperature sensor (2610) measures a current operating temperature of electromagnet (2512). Electromagnet power sensor (2620) measures electrical power characteristics associated with electromagnet 21512), including voltage and current or current alone if the electromagnet is a fixed voltage electromagnet. Sensors associated with each valve (2510) communicate electromagnet operating parameter signals (2520), comprising the outputs of electromagnet temperature sensor (2610) and electromagnet power sensor (2620) to the corresponding valve microcontroller (2400). Valve (2510) is shown in FIG. 2 with a single electromagnet (2512) for clarity. It is noted that electromagnet (2512) can represent multiple electromagnets, e.g. electromagnets (1400, 1410), disposed on opposing sides of reed actuating area (1130). When electromagnet (2512) represents multiple electromagnets, a separate temperature sensor and separate power sensor can be associated with each electromagnet and electromagnet operating parameter signals (2520) includes temperature and power measurements of each electromagnet.

An optional reed position sensor (2630) is disposed to measure the position of reed (2514). Optionally, reed temperature sensors (2640, 2660) are disposed to measure temperature associated with reed (2514). Optional chamber temperature sensors (2640, 2660) are disposed within first chamber (1510) and second chamber (1520), respectively and measure temperature of fluids within the chambers. In another embodiment, at least one reed temperature sensor (not shown) is disposed in contact with or in close proximity to reed (2514), for example mounted on valve block (2550). Optionally, pressure sensors (2650, 2670) are disposed to measure pressure of fluid in chambers of the valve on opposite sides of the reed, e.g. first chamber (1510) and second chamber (1520) respectively. Sensors associated with each valve (2510) communicates its operating parameter signals (2540), comprising the outputs of the optional reed positions sensor (2630), and outputs of optional pressure and temperature sensors (2640, 2650, 2660, 2670) to the valve microcontroller (2400).

Valve microcontroller (2400) receives external data representing timing and trigger data over communication link (2430). This may be in the form of a timing pulse, for example a pulse that is sent by a machine controller when a rotating shaft of the machine passes a 0 angle mark, or may include other data such as shaft position encoding information, e.g., a current shaft position received from an engine controller or an engine shaft sensor. As previously discussed, valve timing control instructions received by valve microcontroller (2400) over communication link (2420) can be relative to a condition or state of an external source, e.g. relative to a timing signal on link 2430. Timing and trigger data received over timing link (2430) is used by valve microcontroller (2400) in making a determination as to when valve (2510) should be actuated to satisfy valve timing control instructions as received over communication link (2420). For example, valve microcontroller (2400) can receive information regarding the speed of rotation an engine shaft, receive timing pulse data indicating when a shaft passes a 0 angle mark, and use the received information to calculate the current angular location of the shaft. The current angular location of the shaft as reported on the timing link is used by the microcontroller in conjunction with timing configuration information received on the communication link to determine valve actuation timing when valve timing control instructions include angle-based ON/OFF timing.

The valve microcontroller receives one or more electromagnet operating sensor signals (2520) and optional additional sensor signals (2540) indicating current operational conditions of the valve (2510) and calculates adjusted valve actuation timing based on the timing signal/source condition or state input parameters and the current operating conditions of the valve. The valve actuation timing is adjusted to account for current valve performance, for example, to account for any valve actuation lag time caused by varying electromagnet temperature. Valve microcontroller (2400) calculates adjusted valve timing so that, given current valve operating conditions, the valve controller sends a valve actuating signal (2410), according to the adjusted timing, to cause valve (2510) to open or close at the specified time. In an exemplary embodiment, actuating signal (2410) is a pulse width modulated (PWM) signal.

As illustrated in FIG. 2, exemplary valve assembly (2700) includes reed valve (2510) and microcontroller (2400) disposed to control the actuation of reed valve (2510) by generating adjusted control signals that actuate the valve. In additional embodiments, microcontroller (2400) can be used to control other types of electronically controllable valves such as, for example, electronically actuated ball valves, diaphragm valves, gate valves, globe valves, piston valves, and any other valve that may exhibit variable valve open/close response time that can change with valve operating conditions. Sensors (2610 through 2670) can include additional types or configurations of sensors to measure additional operating parameters that can affect the operational performance of a valve controlled by microcontroller (2400).

There are many reasons that valve operating performance varies from optimal specification. One factor that contributes to changes in valve response time is that the performance characteristics of electromagnet (2512) change as its temperature increases and decreases, either as a function of the temperature of the valve itself, and/or as a function of the amount of current being passed thru the electromagnet to maintain its setting. In an exemplary valve embodiment (2510), electromagnet (2512) is made from a material that is composed substantially of copper. The electrical resistance of copper increases as the temperature of the material increases and the time it takes the electromagnet (2512) to reach a magnetic force sufficient to actuate reed (2514) increases correspondingly. As temperature of electromagnet (2512) increases, the amount of time it takes the magnet to apply the specified force increases, and the time it takes the valve to open following an initial energization of the electromagnet correspondingly increases.

Figure 3:
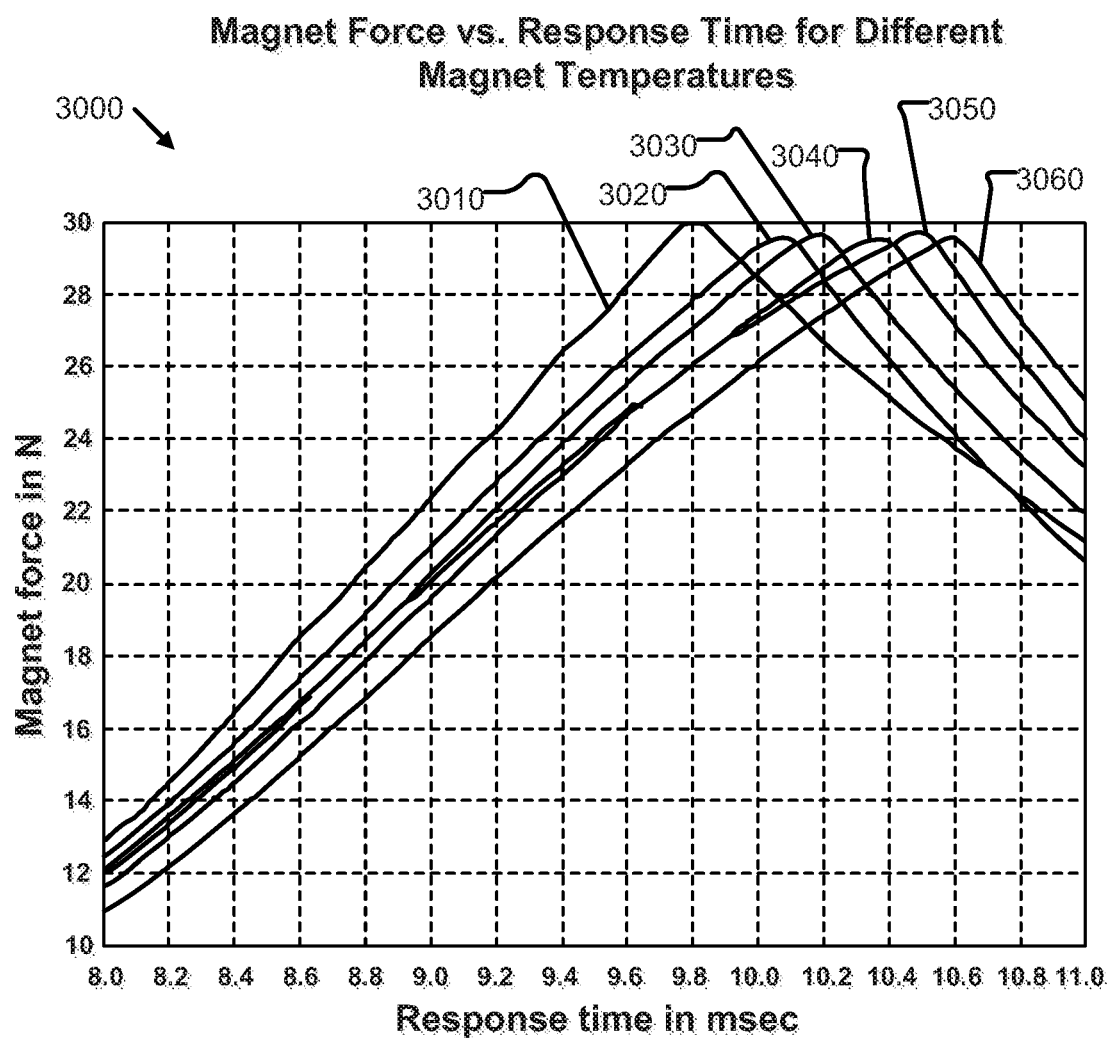
FIG. 3 depicts an exemplary plot depicting experimental data illustrating electromagnet force versus response time at multiple electromagnet temperatures according to one aspect of the present invention.

FIG. 3 illustrates a plot (3000) illustrating changes in valve lag time as temperature at the valve increases or decreases. Trace lines (3010) through (3060) each indicate the amount of time it takes an electromagnet to apply a specific force at a specified temperature after an electric current is initiated to energize the electromagnet. Electromagnet temperature in increased from trace line to trace line, i.e. temperature of (3020) is greater than temperature of (3010), temperature of (3030) is greater than temperature of (3020), etc.). Plot line (3010) illustrated electromagnet response at 292K and plot line (3060) illustrates electromagnet performance at 382$k$.

Plot lines (3010) through (3060) illustrate electromagnet performance over a range of 90K (from 292K to 382K). Over this temperature range, electromagnet response time to apply a load of approximately 30 N is decreased by 0.8 msec. If a particular reed valve requires application of a 30N force to open the valve, the valve opening lag time (time between initial application of electrical current to electromagnet and opening of valve) will increase by 0.8 msec over the 90K temperature range. Thus, an electric current to the electromagnet must be applied 0.8 msec sooner at the high temperature (382K) as compared to the low temperature (292K) to achieve valve actuation at the same desired time point. Additional valve operating parameters, including temperature of reed (2514) and pressure of fluids in contact with the reed can affect valve open and close lag time. Reed (2514) expands as temperature increased and contracts as temperature decreases. Expansion and contraction of reed (2514) between reed end fixation points increases and decreases the amount of energy stored in the buckled reed, which affects the opening and closing dynamics of the valve (2510).

Furthermore, opening and closing times of the valve (2510) are affected by the temperature and pressure of fluids in contact with reed (2514), i.e. temperature and pressure of fluid in first chamber (1510) and in second chamber (1520). Temperature of the fluids in the first chamber (1510) and second chamber (1520) affect the temperature of reed (2514). The material comprising reed (2520) expands as the reed temperature increases, which increases the length of the reed which, in turn, increases the amount of compressive force applied to the reed by fixed constraints, and thereby changes the reed buckling performance, affecting the opening and closing time of the valve. Additionally, the force required to change the buckling state of the sealing area (2555) varies with a pressure differential between first chamber (1510) and second chamber (1520).

Figure 4:
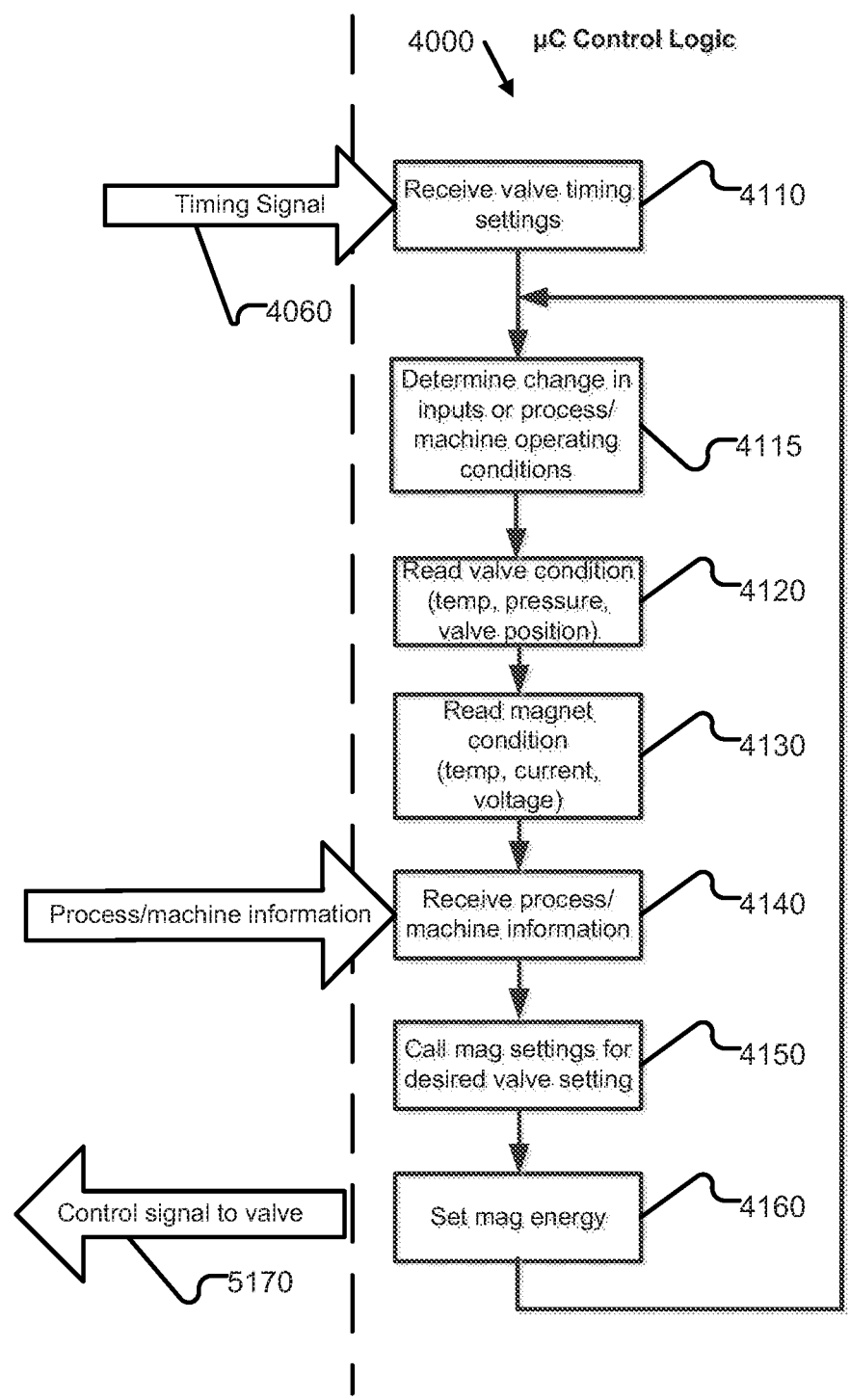
FIG. 4 depicts a flow diagram of a non-limiting exemplary control logic for valve control according to one aspect of the present invention.

Referring to FIG. 4, exemplary microcontroller control logic (4000) illustrates an exemplary, non-limiting example of an operating process that can be implemented by valve microcontroller (2400). Microcontroller logic (4000) receives, from a source such as a machine or process controller, valve timing settings (4110) for valve (2510). Valve timing control settings include valve timing control instructions included in timing signal (4060) such as valve timing control instructions received over communication link (2420) and discussed in more detail in relation to FIG. 2. A determination is made as to whether the received valve timing settings are different from previously received valve timing settings and whether an operational condition of the source has changed (4115).

Valve conditions including open/close position (e.g., fully open, fully closed, rotational position of butterfly valve disk) and, optionally, temperature and pressure of a fluid or fluids in contact with the valve, are read (4120) from valve sensors (2630 through 2670). Current electromagnet operating conditions, including temperature and electrical current of electromagnet (2512), are received (4130) from valve electromagnet sensors (2610, 2620). Data indicating one or more current source conditions, i.e. one or more current conditions of a machine or of a process, is received (4140) from the source. The current source conditions can include timing and trigger data received over the timing link (2430) and discussed in more detail in relation to FIG. 2.

Valve microcontroller (2400) includes data, stored in a local memory, including electrical specifications of an associated valve (i.e. valve (2510)) and valve response time as a function of variables such as temperature and pressure. Valve response time can vary from valve to valve, even among valves of the same type, and each valve microcontroller (2400) can include valve data specific to the particular valve or valve type with which the microcontroller is associated. An analytic model is used to determine adjusted valve timing settings by modifying received valve timing control settings based on current valve conditions so that when the valve is actuated using the adjusted valve timing settings, the valve will complete execution of an open or close command, or of a proportional control command, at the time specified by the received valve timing control settings. Adjusted valve timing settings are calculated (4150), along with any changes in the electromagnet settings corresponding to the desired adjusted valve timing settings, and electromagnet excitation energy parameters are set (4160). A control signal that either energizes or de-energizes the electromagnet (or changes the energization of the electromagnet) is passed to the valve (4170) when a current source condition corresponds to (or passes) the calculated adjusted valve timing settings. The microcontroller control logic (4000) then begins repeating the control loop by looping back to reading valve conditions (4120) and waiting for a change in the input commands and/or process or machine operating conditions (4115). Referring to FIG. 2, valve assembly (2700) includes reed valve (2510). However, it will be understood that valve assembly (2510) can include other types of controllable valves and that microcontroller control logic (4000) can be implemented by microcontroller (2400) to control any other type of controllable valve.

A valve control system according to one aspect of the invention includes sensors to determine current valve operating conditions, one or more valve microcontrollers to adjust valve timing based on data from the sensors, and higher level control components to determine and communicate valve timing to the valve microcontrollers.

A valve control method according to one aspect of the invention includes receiving valve timing instructions, receiving sensor data including measured values of parameters that can affect valve performance characteristics, calculating adjusted valve timing based on the measured values, and actuating one or more valves according to the adjusted valve timing.

Figure 5:
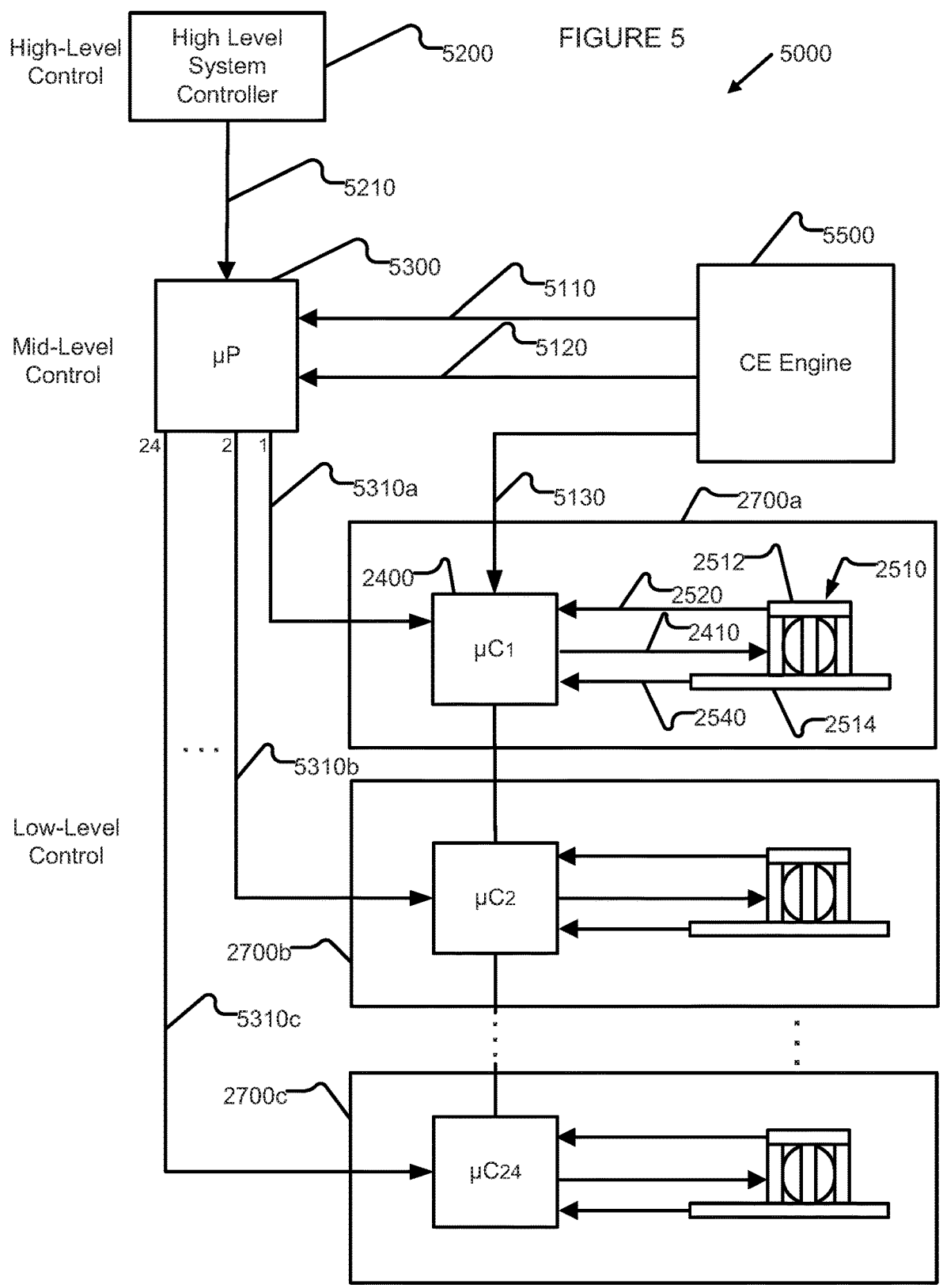
FIG. 5 depicts a schematic diagram of a non-limiting exemplary CE engine control system utilizing the described techniques for controlling valve actuation according to one aspect of the present invention.

Referring now to FIG. 5, an exemplary CE machine control system (5000) is configured to control the operation of an exemplary CE engine (5500) comprising a plurality of buckled reed valves (2510) which open and close according to a variable timing pattern in order to control the flow of one or more pressurized fluids or gasses to drive the rotation of a CE engine shaft (not shown). Rotation of the CE engine shaft provides mechanical energy for producing flow of an operating liquid or gas through the CE engine (5500). Reed valve (2510) represents one or more reed valves that are managed for response time although the number and type of valves may vary without departing from the scope of the invention. In an exemplary embodiment, CE engine (2500) includes 24 reed valves (2510). Control system (5000) components include high level system controller (5200), CE engine level system controller (5300), and valve microcontroller (2400). Each valve microcontroller (2400) is configured to control the operation of one of the plurality of reed valves (2510) in accordance with the methods described herein. Control system (5000) components are divided functionally into high level control, mid-level control, and low level control components.

High level control components include high level systems controller (5200) which is configured to translate CE machine operator inputs into a power/flow command signal (5210). High level systems controller (5200) can be located in the vicinity of other components of control system (5000) or can be located elsewhere at a facility where control system (5000) is housed, for example at a central control location of the facility, and can be located off-site and communicate power/flow command signal (5210) through a communication network such as through a connection over the Internet. Power flow command signal (5210) can include power and/or flow desired in the CE engine as well as direction of flow through the engine, e.g. to store or extract a working fluid from a fluid storage.

Mid-level control components include CE controller (5300). CE controller (5300) receives the power/flow command signal (5210) from high level systems controller (5200). CE controller (5300) receives CE engine specification signal or signals (5110) from CE engine (5500). CE engine specification signals (5110) can include, for example data indicating high and low pressures measured within CE engine, operating fluid temperature, temperatures associated with specific CE engine locations or components, and current CE engine rotational speed (e.g., 1200 RPM). CE engine specification signals (5110) can also include data indicating CE engine performance such as, for example CE engine power, working fluid flow rate, and pressure differential across the CE engine. CE controller (5300) also receives, from CE engine (5500), shaft position signal (5120) which can include a sensor signal indicating shaft position or a timing pulse signal indicating when the shaft passes specific angular mark, for example a 0° shaft angle. CE controller (5300) includes a microprocessor configured to use current CE operational parameter data communicated to the CE controller by the sensor signals (5110, 5120) to determine ON/OFF timing settings for CE engine reed valves (2510) required to operate CE engine (5500) in accordance with power flow command signal (5210). CE controller (5300) generates multiple valve timing signals (5310a through 5310c). In an example embodiment, CE controller (5300) calculates, using rotational speed (RPM) of the CE engine shaft and a shaft timing pulse, current valve ON/OFF timing settings as offsets of the 0° shaft angle mark. Valve timing signals (5310a through 5310c) are communicated to valve microcontrollers (2400) over a communication interface that can include a Controller Area Network (CAN) bus or any other communication interface using a communication protocol, e.g., include the Highway Addressable Remote Transducer (HART) Communications Protocol, that satisfies the data bandwidth of the valve controller (2400). Each valve timing signal (5310a, 5310b, through 5310c) includes ON/OFF timing settings corresponding to one of the plurality of reed valves (2510).

Low level control components include multiple valve assemblies (2700a, 2700b, 2700c). The temperature of each valve in the valve assemblies, including electromagnet temperature and reed temperature, can vary continuously during operation, in particular, due to high actuation duty cycle operation typical of a valve installed as part of a CE machine. Each valve can be independently exposed to differing working temperature and pressure. Valves are heated or cooled by fluids passing through the CE machine. Temperature of the fluids can vary widely, especially if the machine is cycled between compression and expansion modes of operation. For example, some valves are in contact with hot fluids while other valves are in contact with cold fluids. Thus each valve can have a variable opening lag time that is independent of the lag time of each other valve.

Valve microcontroller (2400) is configured to receive a valve timing signal from CE controller (5300) and to calculate and communicate a corresponding adjusted valve control signal to reed valve (2510). In an embodiment, control system (5000) includes multiple valve assemblies (2700), e.g., twenty four valve assemblies, each including a valve microcontroller (2400) configured to control the operation of a corresponding one or more of a plurality of reed valves (2510), e.g., one of twenty four reed valves. In an embodiment, each valve microcontroller (2400) controls the corresponding reed valve (2510) by calculating adjustments to incoming control signals to compensate for valve operating conditions, and communicating condition-adjusted valve actuation signals (2410) to the corresponding reed valve. In alternative embodiments, a valve controller may control a plurality of valves.

CE Engine (5500) comprises a shaft encoder that communicates shaft position signals (5130), which can include either (or both) a timing pulse indicating when the shaft passes a specific angle (e.g., when the shaft passes 0 angle) or position data indicating the current position of the CE engine shaft, to each of the valve microcontrollers. In an alternative embodiment, CE controller (5300) communicates the timing pulse or current position of the CE shaft to the valve microcontrollers. Each of the valve microcontrollers (2400) receives a valve timing signal (5310a, 5310b, etc.), determines current shaft position (if required), calculates the valve timing adjustment parameters based on received information including electromagnet temperature, reed position, and current shaft position, determines the timing of required valve control signals, and communicates valve control signals (2410) that include the adjusted valve timing parameters to a valve (2510). The valve control signals are calculated so that under current operating conditions, the valve operates fully at the specified timing.

Control system (5000) includes high level systems controller (5200), CE controller (5300), valve microcontroller (2400), and reed valves (2510) configured as separate components. Additional embodiments include control components combined as single components comprising two or more subcomponents. For example, a merged controller component can include a CE controller (5300) sub-component and a valve microcontroller (2400) sub-component. In an exemplary operating mode, a merged controller component including a CE controller (5300) and valve microprocessor (2400) can receive a control input based on a desired power (e.g., power of 200 kW for the next 5 seconds) or desired flow (flow rate of 100 gpm for the next 5 seconds). A valve assembly (2700) having built-in control logic can include a valve microcontroller sub-component combined with a reed valve (2510) sub-components. A valve microcontroller (2400) can be configured as a component separate from a controllable reed valve (2510) that includes an integrated control component (not shown) and can provide operating condition adjusted actuation signals to the integrated reed valve control component. Further, high level controller (5200), CE controller (5300), and valve microcontroller (2400) can be merged to form a single control component.

In further alternative embodiments, reed valves (2510) can include additional types of valves, for example addition types of valves having hydraulic, pneumatic, magnetic and piezoelectric actuation can be used in place of or in combination with electromagnetically actuated reed valves.

In an embodiment, a CE system includes a plurality of valve assemblies, valve control systems, and valve control methods according to the technology described herein. The CE system includes valve microcontrollers that manage the valve operation based upon timing instructions (open/close angles) provided to the controllers. An exemplary valve microcontroller (2400) is configured to compensate for variable valve performance including valve open/close lag time that changes as valve conditions, including the temperature of one or more valve electromagnets (2512), fluctuate. The valve microcontroller receives valve opening or closing timing instructions including a specified ON/OFF angle, which indicates that the valve should be fully open at a first (ON) shaft rotation angle and that the valve should be fully closed at a second (OFF) shaft rotation angle. The valve microcontroller receives input indicating the shaft rotational position and sensor reading indicating current valve conditions. Valve conditions that can affect valve lag time include, for example, temperature of the valve electromagnet, electrical power (current and voltage) that is energizing the electromagnet, position of the reed, pressure at the reed, and temperature of the reed. The valve ON/OFF angle timing is adjusted so that when an actuating signal is applied to the electromagnet at the adjusted ON/OFF angle, the valve will be in a fully open state when the shaft reaches the specified ON shaft angle. The valve microcontroller opens and closes the valve using the adjusted timing so that the valve opens or closes in accordance with the timing instructions that were received by the valve microcontroller.

Figure 6:
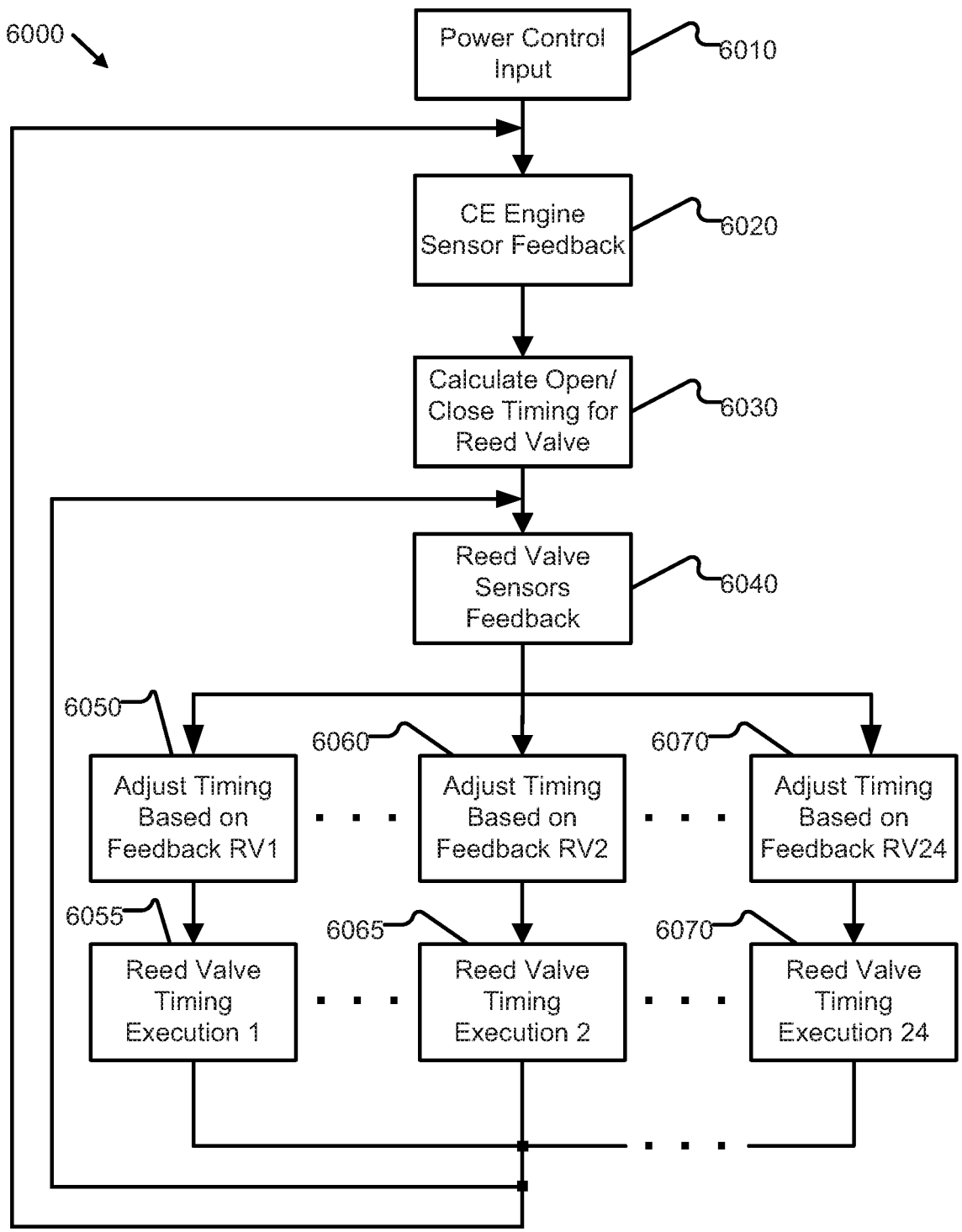
FIG. 6 depicts a flow diagram of a non-limiting exemplary CE engine control process that can be used to adjust valve timing in a CE engine to compensate for changes in electromagnet performance parameters.

One exemplary CE engine control process (6000) that can be used to adjust valve timing in a CE engine to compensate for changes in electromagnet performance parameters is depicted in FIG. 6. Control process (6000) can be implemented by an exemplary CE engine control system (5000) depicted in FIG. 5. CE engine power control inputs are received (6010) from an operator of the CE engine. Power control inputs include, for example, the amount of power and/or flow rate that is desired with the CE engine. One or more sensors associated with the CE engine provide feedback (6020) useful for determining operational settings of the CE engine. Sensor feedback can include, for example, data indicating shaft position and other measurement results that indicate current operating parameters of the CE engine. Operational settings required to achieve desired power control outputs are calculated (6030). Calculated operational parameters include valve timing including ON and OFF angles of each of the reed valves.

Feedback from sensors associated with each of the reed valves is received (6040). Reed valve sensor feedback includes measurement data indicating current reed valve operating parameters such as, for example, the temperature of each reed valve electromagnet, electromagnet current and voltage, position of each reed, and pressure at each reed valve. Timing of each reed valve is adjusted based on sensor feedback (6050, 6060, 6070). The timing is adjusted to account for effects on reed valve performance due to measured reed valve operating parameter values. For example, as the temperature of a reed valve electromagnet increases or decreases the response time of the reed valve to an actuating signal may change. Because the electromagnet temperature and other operating parameters may be different for each reed valve, a separate timing adjustment is calculated for each reed valve. For example, if the electromagnet performance is diminished by heating of the electromagnet, a valve opening that normally occurs in 1 ms may take 2 ms. Based upon the known rotational position of the CE shaft and its speed of rotation, an instruction to open the valve at 170 degrees shaft position might be started when the shaft reaches 160 degrees when the electromagnet is cold and at 150 degrees when the electromagnet is hot in order to assure that the valve completes its opening as the shaft crosses the 170 degree position. It is also recognized that the timing of opening the valve may be further adjusted based on other measurements, calculations or predictions, e.g., adjusting compensation based on predictions of opening time after adjustment versus actual opening time.

The adjusted reed valve timing is executed for each reed valve (6055, 6065, 6075) wherein each reed valve, for example reed valves 1 through 24, is controlled to open or close at a specific ON or Off angle (or not change position as determined by the adjusting the reed valve timing (6050, 6060, 6070). The control process (6000) then begins repeating the control loop by looping back to receiving CE engine feedback (6020) and receiving reed valve sensor feedback (6065).

Figure 7:
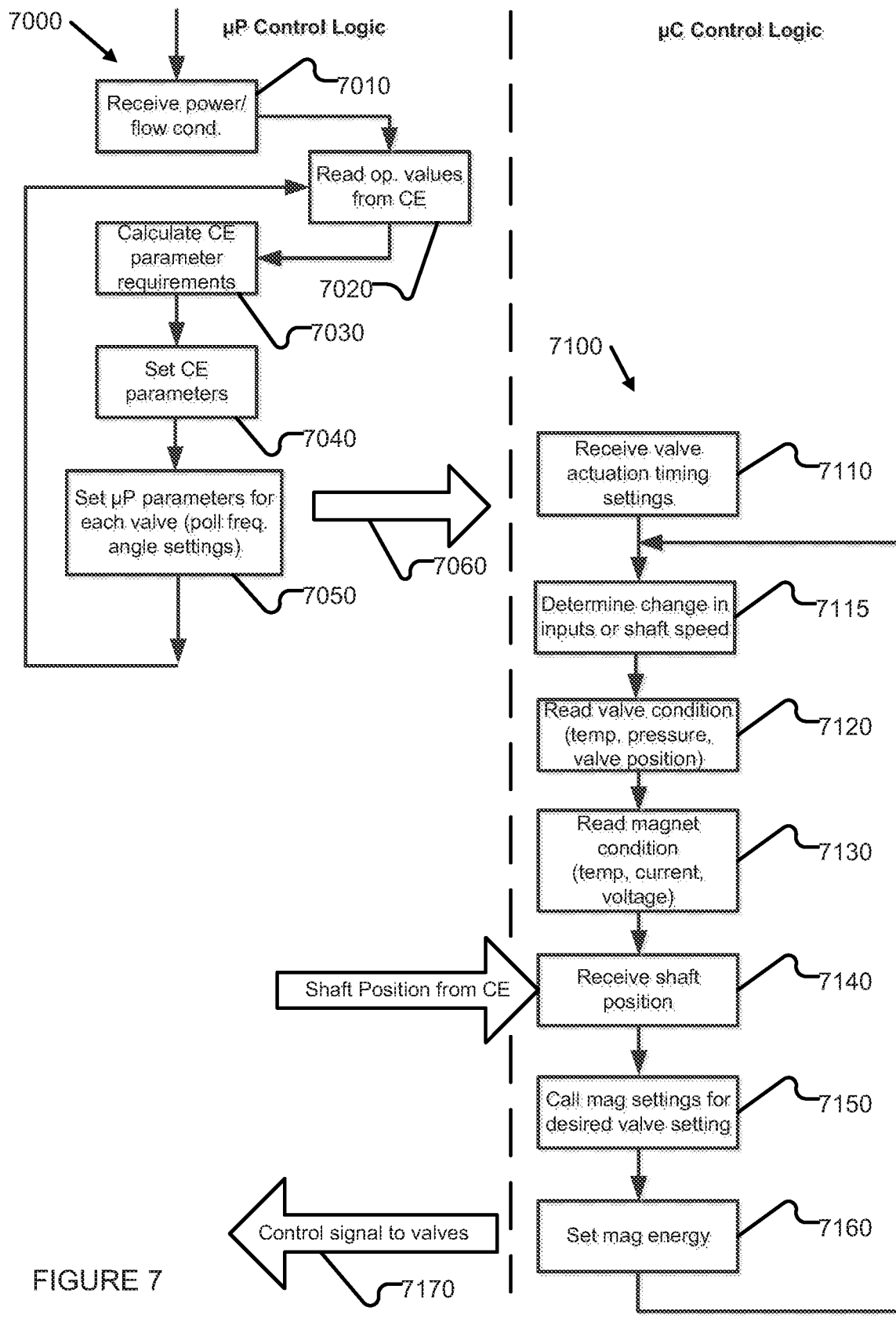
FIG. 7 depicts a flow diagram of a non-limiting exemplary control logic for CE machine and valve control according to one aspect of the present invention.

Referring to FIG. 7, exemplary microprocessor control logic (7000) illustrates an exemplary, non-limiting example of an operating process that can be implemented by CE controller (5300). Microcontroller control logic (7100) illustrates a non-limiting example of an operating process that can be implemented by valve microcontroller (2400).

Microprocessor control logic (7000) operating on CE controller (5300) receives desired CE engine power/flow conditions (7010) that are included in power/flow command signal (5210) sent by high level systems controller (5200). Data indicating values of current CE engine operating parameters, including for example shaft position, high and low pressures, and operating fluid temperatures (7020), are read from the CE engine (5500). CE controller (5300) implements an analytic model to calculate CE parameter requirements (7030) using desired CE engine power flow conditions and current CE engine operating parameters as inputs to the analytic model. CE parameters calculated to achieve the desired CE engine power flow conditions are set (7040) and the CE parameters are used to set microprocessor-determined operational parameters for each valve (7050) including, for example, electromagnet poll frequency settings, i.e. the frequency at which valve parameter data (e.g., electromagnet temperature, reed parameter data) is received by a valve microcontroller (2400), and valve timing including OFF and ON angles. The microprocessor-determined operational parameters are then passed (7060) to microcontroller control logic (7100). Microprocessor control logic (7000) then begins repeating the control loop by looping back to reading operating values from the CE engine (7020).

Microcontroller control logic (7100) operating on each one of the valve microcontrollers (2400) receives the microprocessor-determined valve timing settings (7110) for the particular reed valve (2510) that corresponds to the valve microcontroller. A determination is made as to whether the received valve timing settings are different from previously received valve timing settings and whether the CE engine shaft speed has changed (7115). Valve conditions including reed position and, optionally, temperature and pressure of the valve chamber surrounding the reed (1510, 1520), are read (7120) from reed valve sensors (2630 through 2670). Operating conditions, including current temperature, current, and voltage of electromagnet (2512), are received (7130) from reed valve electromagnet sensors (2610, 2620). Current shaft position is received as a timing signal (7140) from the CE engine (5500). In an embodiment, timing signal includes a table of shaft positions. An analytic model is used to determine adjusted valve timing settings by modifying microprocessor-determined valve timing adjustment settings based on current reed and electromagnet conditions. Adjusted valve timings settings are calculated (7150), along with any changes in the electromagnet settings corresponding to the desired adjusted valve timing settings, and electromagnet excitation energy parameters are set (7160). A control signal that either energizes or de-energizes the electromagnet (or changes the energization of the electromagnet) is passed to the reed valve (7170) when the shaft setting corresponds (or passes) the calculated adjusted shaft setting. The microcontroller control logic (7100) then begins repeating the control loop by looping back to reading valve timing settings (7110) and waiting for a change in the input commands and/or the CE engine shaft speed (7115).

In an exemplary embodiment of a CE machine, lag time between signaling a valve to open and the valve reaching a fully open state can be 3° to 20° of a 360° rotational cycle of the CE engine shaft, and can vary with electromagnet temperature, reed temperature, reed pressure, and other valve parameters. Thus to open at, for example, a 150° shaft angle, the valve must start opening at 130° to 145° instead of being triggered to open when the shaft angle reaches 150 degrees. CE engine (1500) is typically operated at a rotational speed in the range from 15 Hz to 60 Hz, preferably at a rotational speed that is evenly divisible into power line frequency (i.e. 6.25/12.5/25/50 Hz for EU based upon number of poles). For example, an exemplary CE engine is operated at 20 Hz. Rotation of the CE engine shaft through a full 360° takes 50 msec, so that in 1 msec, the shaft rotates through 7° of the full 360°. If the exemplary valve electromagnet temperature changes by 90K, the ON/OFF timing angle of the valve must be adjusted by 5.6° to achieve the desired ON/OFF position at a configured shaft angle.

Therefore, according to one embodiment of the invention, a valve assembly includes a controllable valve selectively actuatable to control flow of a fluid therethrough, with the controllable valve having a variable valve open/close response time. The valve assembly also includes a plurality of sensors configured to measure current operational parameters of the controllable valve and/or the fluid and a valve controller programmed to process valve timing control instructions generated by an external source, process inputs from the plurality of sensors regarding the measured operational parameters of the controllable valve and/or the fluid, and provide an actuation signal to the controllable valve based on the valve timing control instructions and the inputs from the plurality of sensors, so as to control a timing of an actuation of the controllable valve.

According to another embodiment of the invention, a controller implemented method for controlling actuation of a valve having a variable valve open/close response time to control flow of a fluid therethrough is provided. The method includes receiving valve timing control instructions from an external source, the valve timing control instructions associated with operation of an external machine operationally connected to the valve and measuring one or more current operating parameters of the valve and/or the fluid flowing therein via a plurality of sensors positioned on or adjacent the valve. The method also includes determining a timing adjustment to apply to the valve timing control instructions based on the measured one or more current operating parameters and generating and providing an actuation signal to the valve with the timing adjustment included therein, so as to control a timing of the actuation of the valve.

According to yet another embodiment of the present invention, a compressor-expander (CE) system includes a CE engine driven by a CE engine shaft and one or more valve assemblies configured to control the flow of one or more pressurized fluids or gasses to drive rotation of the CE engine shaft. Each of the one or more valve assemblies comprises a microcontroller that operates to receive valve timing control instructions generated by a CE engine controller, receive inputs from a plurality of sensors positioned on or adjacent a valve of the valve assembly that comprise current operational parameters of the valve and/or the pressurized fluids or gasses measured by the plurality of sensors, determine a timing adjustment to apply to the valve timing control instructions based on the inputs, and generate and provide an actuation signal to the valve with the timing adjustment included therein, so as to control a timing of the actuation of the valve.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. use in the CE machine), those skilled in the art will recognize that its usefulness is not limited thereto and that the present invention can be beneficially utilized in any number of environments and implementations where it is desirable to have valves which operate differently under differing operating conditions operate in a consistent manner as these operating conditions vary. Accordingly, the claims set forth below should be construed in view of the full breadth and spirit of the invention as disclosed herein.

What is claimed is:
1. A valve assembly comprising:
a controllable valve selectively actuatable to control flow of a fluid therethrough and having a variable valve open/close response time, with the controllable valve comprising:
first and second chambers connected by a passageway;

a reed positioned in the passageway, between the first and second chambers, and formed from a spring material; and at least one electromagnet disposed adjacent an actuating area of the reed, the at least one electromagnet configured to generate a magnetic field that provides activation energy to toggle the reed between open and closed positions;

wherein opening and closing of the reed selectively controls flow of the fluid through the passageway between first and second chambers;

a plurality of sensors configured to measure current operational parameters of the controllable valve and the fluid; and a valve controller programmed to:
  process valve timing control instructions generated by an external source;
  process inputs from the plurality of sensors regarding the measured current operational parameters of the controllable valve and the fluid; and
  provide an actuation signal to the controllable valve based on the valve timing control instructions and the inputs from the plurality of sensors, so as to control a timing of an actuation of the controllable valve;

wherein the plurality of sensors comprises reed valve pressure sensors positioned within the first and second chambers of the controllable valve; and wherein the measured current operational parameters of the controllable valve and the fluid comprises a pressure of the fluid within the first and second chambers, on opposite sides of the reed.

2. The valve assembly of claim 1 wherein the plurality of sensors comprises an electromagnet temperature sensor and an electromagnet power sensor for each of the at least one electromagnets; and
  wherein the measured operational parameters of the controllable valve and/or the fluid comprises a current operating temperature of the at least one electromagnets and electrical power characteristics of the at least one electromagnets, the electrical power characteristics comprising one or more of a voltage and current of the at least one electromagnets.

3. The valve assembly of claim 1 wherein the plurality of sensors comprises a reed position sensor and one or more valve temperature sensors, the one or more valve temperature sensors comprising one or more of a reed temperature sensor positioned proximate the reed, a first chamber temperature sensor, and a second chamber temperature sensor; and
  wherein the measured current operational parameters of the controllable valve and/or the fluid comprises a reed position and a temperature of the reed valve at one or location therein.

4. The valve assembly of claim 1 wherein the valve timing control instructions generated by the external source are associated with a machine parameter of an external machine operationally connected to the valve assembly.

5. The valve assembly of claim 1 wherein, in providing the actuation signal to the controllable valve, the valve controller is programmed to adjust timing of the actuation of the controllable valve from an actuation time of the controllable valve as indicated in the valve timing control instructions generated by the external source.

6. The valve assembly of claim 5 wherein the adjusted timing of the actuation of the controllable valve accounts for the current operational parameters of the controllable valve and/or the fluid and any valve actuation lag time associated therewith.

7. The valve assembly of claim 1 wherein the valve controller is further programmed to have stored thereon electrical specifications of the controllable valve and a valve response time as a function of temperature and pressure thereof.

8. A controller implemented method for controlling actuation of a valve having a variable valve open/close response time to control flow of a fluid therethrough, the valve comprising first and second chambers connected via a passageway having a valve member positioned therein, wherein the method comprises:
  receiving valve timing control instructions from an external source, the valve timing control instructions associated with operation of an external machine operationally connected to the valve;
  measuring one or more current operating parameters of the valve and/or the fluid flowing therein via a plurality of sensors positioned on or adjacent the valve;
  determining a timing adjustment to apply to the valve timing control instructions based on the measured one or more current operating parameters; and
  generating and providing an actuation signal to the valve with the timing adjustment included therein, so as to control a timing of the actuation of the valve;
  wherein measuring the one or more current operating parameters of the valve comprises:
    measuring an operating temperature and an electrical power characteristic of an electromagnet included in the valve, the electromagnet configured to generate a magnetic field that provides activation energy to toggle the valve member included in the valve between open and closed positions;
    measuring a position of the valve member included in the valve and a temperature of the valve member; and
    measuring a fluid pressure within the first and second chambers in the valve, on opposite sides of the valve member, with fluid flow between the first and second chambers controlled by actuation of the valve member; and
  wherein the fluid pressure within the first and second chambers in the valve is measured by pressure sensors positioned in the first and second chambers.

9. The method of claim 8 further comprising applying an analytic model to determine the timing adjustment to apply to the valve timing control instructions, the analytic model accessing electrical specifications of the valve and a valve response time of the valve as a function of temperature and pressure thereof.

10. A compressor-expander (CE) system comprising:
  a CE engine comprising a CE engine shaft; and
  one or more valve assemblies configured to control a flow of one or more pressurized fluids or gasses to drive rotation of the CE engine shaft, with rotation of the CE engine shaft providing mechanical energy for producing a flow of an operating liquid or gas through the CE engine;
  wherein each of the one or more valve assemblies comprises a microcontroller configured to:
    receive valve timing control instructions generated by a CE engine controller;
    receive inputs from a plurality of sensors positioned on or adjacent a valve of the one or more valve assemblies, the inputs comprising current operational parameters of the valve and/or the one or more pressurized fluids or gasses measured by the plurality of sensors;

determine a timing adjustment to apply to the valve timing control instructions based on the inputs; and generate and provide an actuation signal to the valve with the timing adjustment included therein, so as to control a timing of the actuation of the valve and thereby control the flow of the one or more pressurized fluids or gasses.

11. The CE system of claim 10 wherein the valve of each of the one or more valve assemblies comprises a reed valve including:

a reed formed from a spring material; and at least one electromagnet disposed adjacent an actuating area of the reed, the at least one electromagnet configured to generate a magnetic field that provides activation energy to toggle the reed between open and closed positions;

wherein opening and closing of the reed selectively controls a fluid flow through a passageway between first and second chambers of the reed valve.

12. The CE system of claim 11 wherein the plurality of sensors comprises an electromagnet temperature sensor and an electromagnet power sensor for each of the at least one electromagnets; and wherein the current operational parameters comprise an operating temperature of the at least one electromagnets and electrical power characteristics of the at least one electromagnets, the electrical power characteristics comprising one or more of a voltage and current of the at least one electromagnets.

13. The CE system of claim 11 wherein the plurality of sensors comprises a reed position sensor and one or more valve temperature sensors, the one or more valve temperature sensors comprising one or more of a reed temperature sensor positioned proximate the reed, a first chamber temperature sensor, and a second chamber temperature sensor; and wherein the current operational parameters comprise a reed position and a temperature of the reed valve at one or location therein.

14. The CE system of claim 11 wherein the plurality of sensors comprises reed valve pressure sensors positioned adjacent the first and second chambers; and wherein the current operational parameters comprise a pressure of the fluid within the first and second chambers.

15. The CE system of claim 11 wherein the actuation signal with the timing adjustment included therein accounts for the current operational parameters of the valve and/or the one or more pressurized fluids or gasses, and any valve actuation lag time associated therewith.

* * * * *